United States Patent [19]

Harding

[11] Patent Number: 4,707,030

[45] Date of Patent: Nov. 17, 1987

[54] SEAT ASSEMBLY

[75] Inventor: Dukecal J. Harding, Markham, Canada

[73] Assignee: Magna International Inc., Markham, Canada

[21] Appl. No.: 831,528

[22] Filed: Feb. 21, 1986

[30] Foreign Application Priority Data

Jun. 18, 1985 [CA] Canada ................................. 484400

[51] Int. Cl.⁴ .............................................. B60N 1/02
[52] U.S. Cl. ..................................... 297/341; 248/430
[58] Field of Search ................ 297/341, 346; 248/429, 248/430

[56] References Cited

U.S. PATENT DOCUMENTS

| | | |
|---|---|---|
| 1,684,944 | 9/1928 | Chapman ............................ 248/429 |
| 2,951,527 | 9/1960 | Wassilieff ....................... 248/430 X |
| 3,288,422 | 11/1966 | Krause ................................ 248/429 |
| 3,811,726 | 5/1974 | Muraishi et al. .................... 297/341 |
| 3,981,473 | 9/1976 | Nagai .................................. 248/430 |
| 4,101,169 | 7/1978 | Muraishi et al. .................... 297/341 |
| 4,378,101 | 3/1985 | Kazaoka et al. .................... 248/430 |
| 4,422,690 | 12/1983 | Kopich ............................... 297/341 |
| 4,497,518 | 2/1985 | Nishimura et al. ................. 297/341 |
| 4,569,557 | 2/1986 | Goforth ............................. 248/430 |

Primary Examiner—Francis K. Zugel
Attorney, Agent, or Firm—Ivor M. Hughes

[57] ABSTRACT

This invention relates to a seat assembly especially suitable for use on a front seat of a two door vehicle and particularly relates to a comfort adjustment manual override seat track assembly for permitting, seat position adjustment, and the seat to slide forward to permit access to behind the seat and return to its initial position.

52 Claims, 26 Drawing Figures

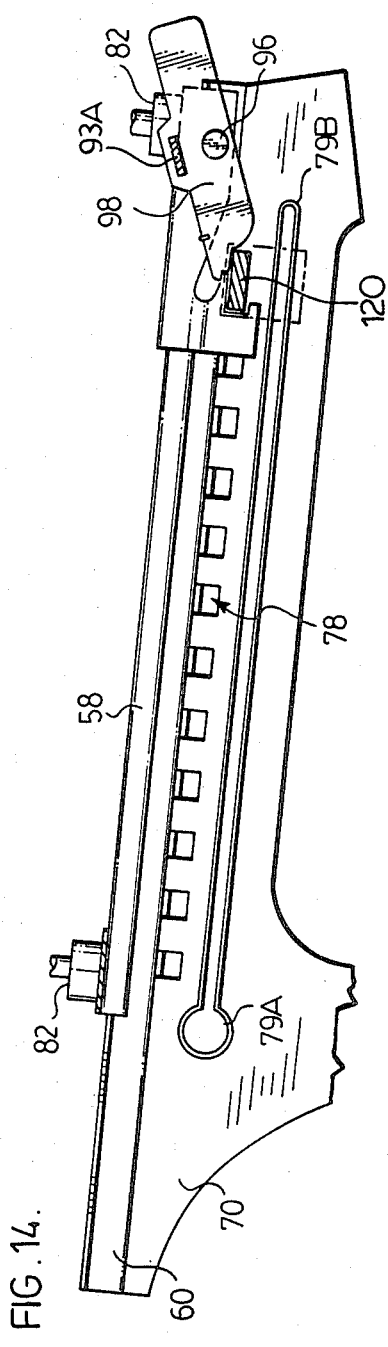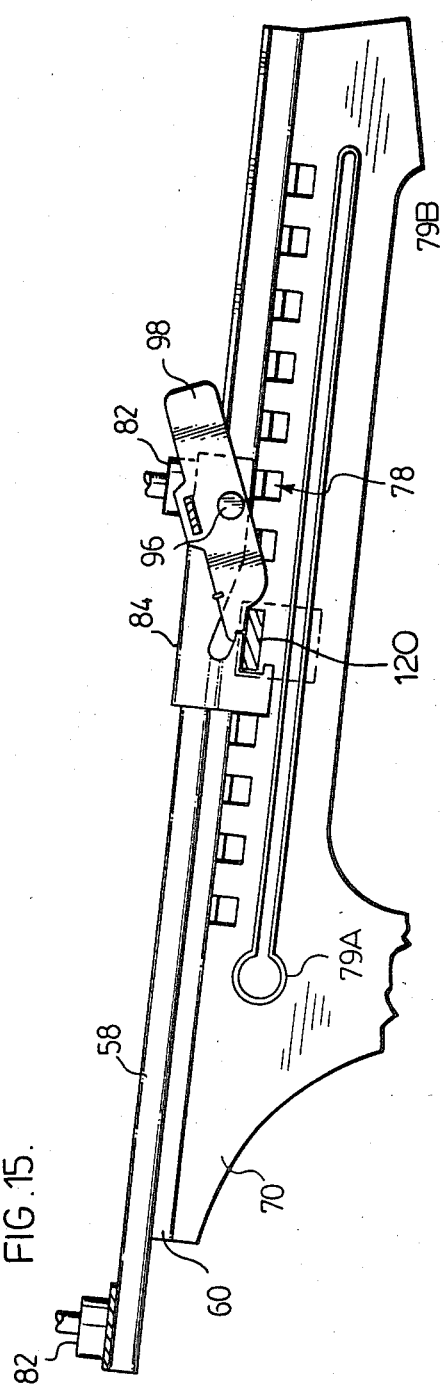

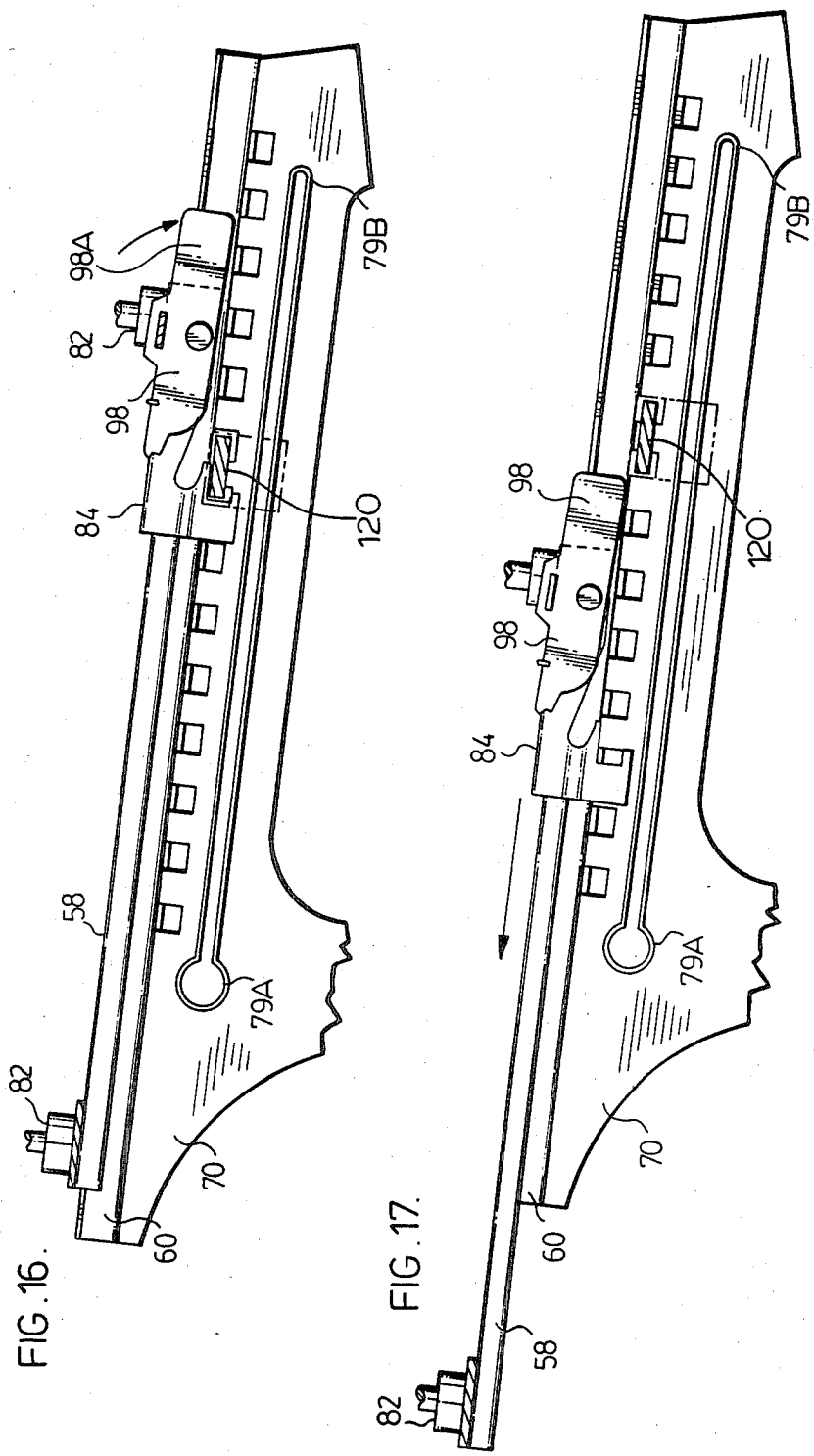

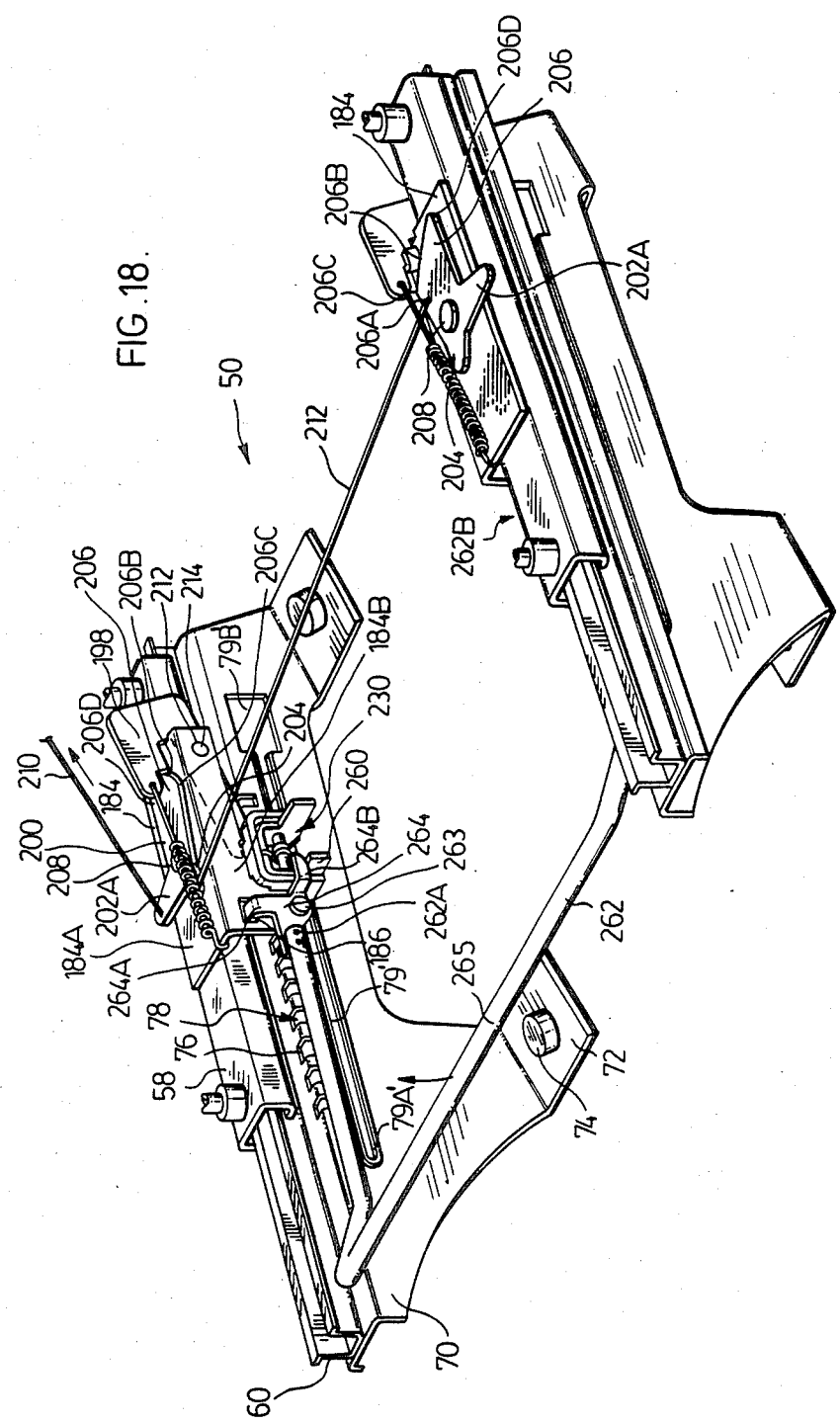

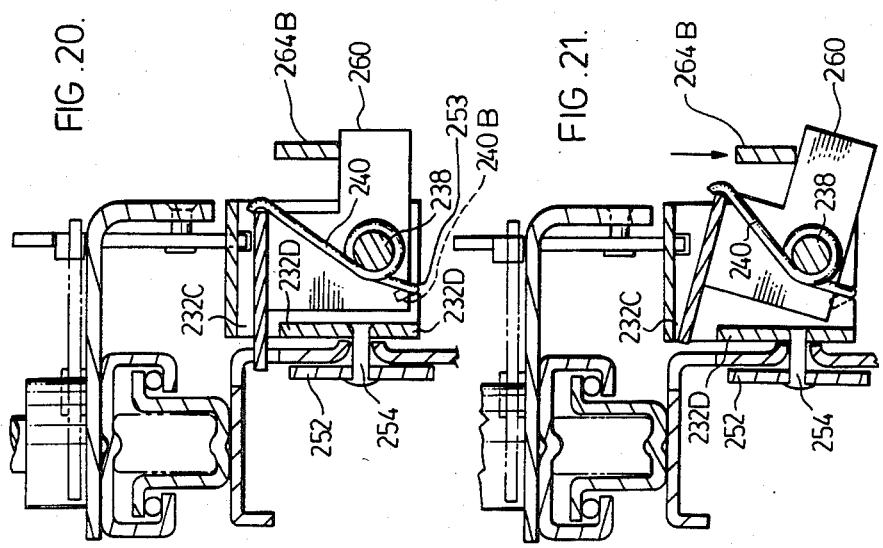

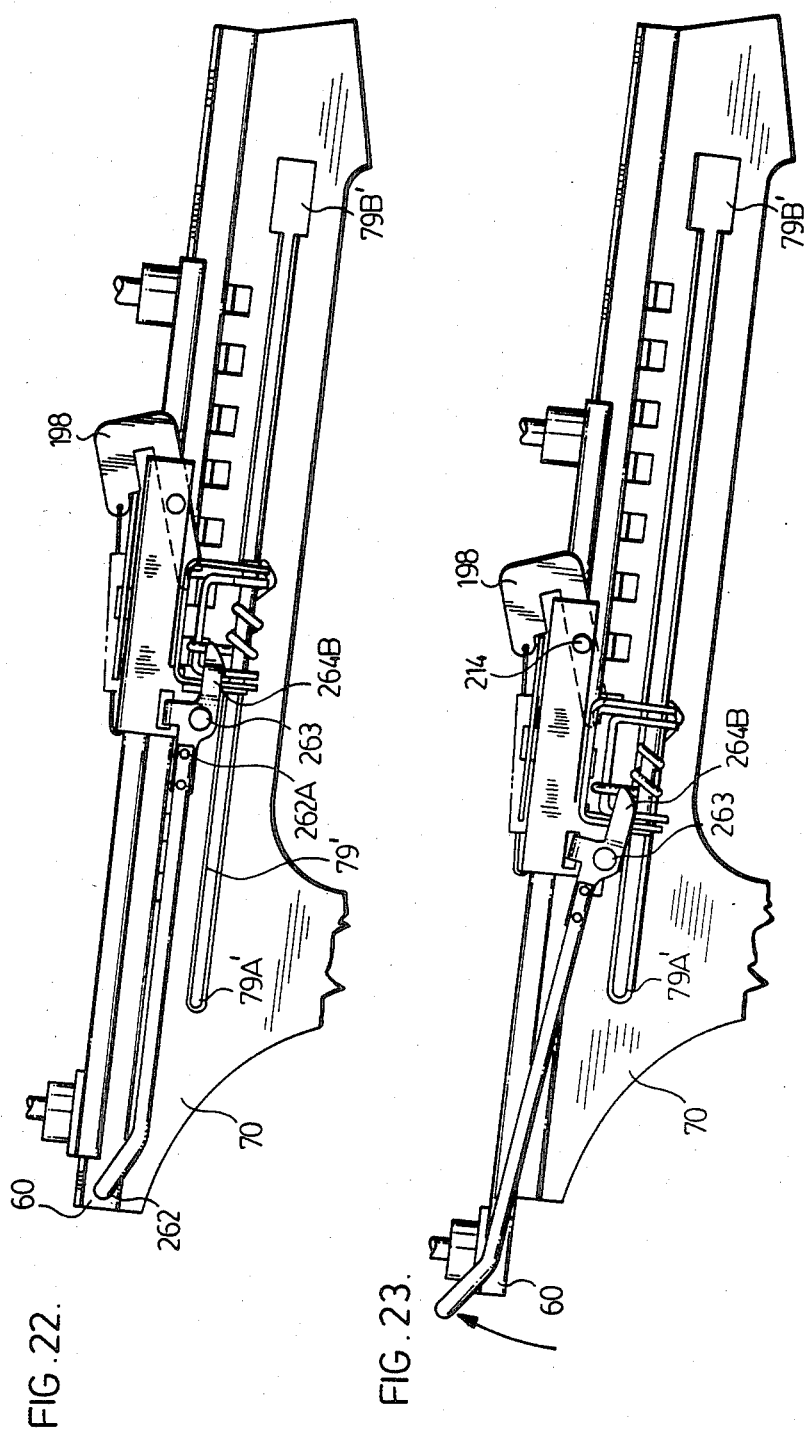

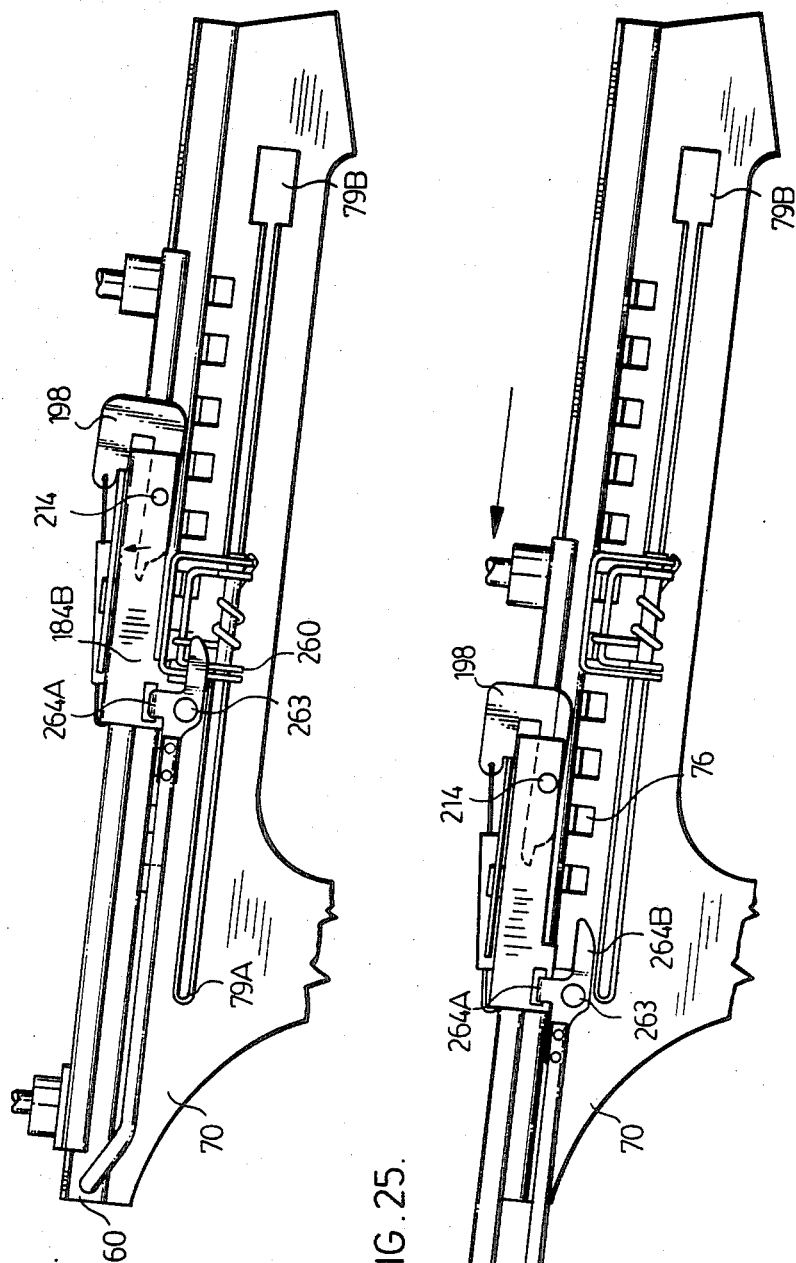

SEAT ASSEMBLY

FIELD OF INVENTION

This invention relates to a seat assembly especially suitable for use on a front seat of a two door vehicle and particularly relates to a comfort adjustment manual override seat track assembly for permitting, seat position adjustment, and the seat to slide forward to permit access to behind the seat and return to its initial position.

BACKGROUND OF THE INVENTION

A variety of seat track designs have been proposed to meet the growing demand for a seat track system that permits comfort adjustment of the seat, and permits the seat to slide forward to provide access to the rear of the seat "remembering" its initial position and then returns and locks in that "remembered" position.

However, the designs are mechanically complex in their operation, prone to manufacturing difficulties when produced in "high volume" production, costly to produce and subject to failure due to in service wear and tear and poor design.

In practice, it has been found that a common weakness of these designs is related to the mandatory requirement that the memory system be very rapid in its operation in order that the locking mechanism cannot skip over the "remembered" position when the seat is forcefully returned to the desired preset driving position. As will be known by those skilled in the art, current safety standards require such seating systems withstand a minimum forward pull test in the order of 5,000 pounds force. This mandates robust construction and the attendant inertia mass, thus requiring the use of powerful springs to cause rapid actuation of the mechanism, making it difficult to operate the system smoothly. See for example, United Kingdom patent application Nos. 2,033,738; 2,091,548; and 1,459,605 and U.S. Pat. No. 3,940,182 and 4,101,169.

In some of those references, "memory devices" are provided which purport to mechanically "remember" the initial position of the seat when the seat is released from its locked position and is moved forward to permit access behind the seat.

Other approaches are shown in U.S. Pat. No. 4,440,442 and United Kingdom Pat. No. 1,344,271.

U.S. Pat. No. 4,440,442 does not provide a true memory as such which sets itself when the seat slides forward. Rather this Patent teaches the use of upper and lower vertically stacked track assemblies slideable relative to one another only one of which moves at one time and provides minimal adjustment and access.

United Kingdom Pat. No. 1,344,271 discloses a vertically upstanding tab moveable along a track and lockable with respect thereto and a slide to which the seat is secured slideable along the track and carrying a pivotable clasp comprising an aperture therethrough to capture and hold the tab through the aperture in the clasp until the clasp is lifted by rotation caused by the pivoting of the seatback freeing the tab to permit relative movement of the slide relative to the track and tab.

However, this proposal suffers many deficiencies. When the tab is released (freed) from the clasp, the seat can move either forward or backward. Additionally, the clasp-tab arrangement does not provide a positive secure lock arrangement and is easily dislodged. In a rear-end collision, the clasp could be dislodged and the seat easily thrown to the back of the vehicle.

Another serious deficiency of the system proposed by United Kingdom Pat. No. 1,344,271 relates to its inapplicability to curved seat track systems. Many seat track systems presently manufactured, provide for a curved track and curved slide for carrying the seat for movement along the track. The curve usually extends from a raised position closer the windshield to a lower position further from the windshield to position the eyes of both taller and shorter drivers at the same horizontal level. As a short driver would normally sit closer to the windshield, he is positioned at a higher level, whereas a taller person having longer legs and a longer torso is positioned to sit further from the windshield and at a lower level.

It is therefore an object of this invention to provide a comfort adjustment manual override seat track assembly for use with a seat which is easy to manufacture, entirely reliable, mass produceable at minimal cost and applicable to curved track systems.

Further and other objects of the invention will be realized by those skilled in the art from the following summary of the invention and detailed description thereof.

SUMMARY OF THE INVENTION

According to one aspect of the invention, a comfort adjustment manual override seat track assembly is provided suitable for securing a seat (in one embodiment having a seat bottom and seatback pivotal with respect to the seat bottom) to the floor of a vehicle to permit the seat's position to be adjusted relative to the front of the vehicle and permit the seat to be moved from that adjusted position towards the front of the vehicle to permit maximum access to behind the seat to be returned to that adjusted position, the assembly comprising:
(a) a pair of laterally spaced tracks and supports therefor for being secured to the vehicle, at least one of the tracks and supports carrying a plurality of apertures (in one embodiment along its length on the side of the track and support closest to the other track) and preferably both tracks and supports carrying a plurality of apertures and preferably on their sides closest the other track and support;
(b) a fastener slideably secured to at least one of the tracks and associated supports carrying the plurality of apertures for slideable movement relative thereto and for being removeably secured thereto by extending into at least one aperture precluding longitudinal movement with respect to the track and associated support of the fastener until deliberately disengaged therefrom;
(c) means to engage and disengage each such fastener from the at least one aperture of the track and associated support;
(d) a slide secured to each track and support to which each fastener is slideably secured for relative longitudinal movement with respect thereto and for being secured to the bottom of the seat, preferably one slide carried on each track and support for relative longitudinal movement and secured to each other for movement together, each slide carrying a depending trap (preferably from the side of the slide closest to the opposite slide), the trap comprising a pair of spaced walls, a forward wall and a rear wall, the forward wall being closest to the front of a vehicle in which the assembly is mounted and being fixed relative to the slide and the rearward wall being displaceable (as for example, by pivoting) from a normally trapping position with the front wall to trap the associated fastener between the walls, to a position whereat the rearward wall of the trap does not trap the fastener to permit the slide to travel forward, the motion of the displacement of the rearward wall of the trap being in a plane parallel to the direction of movement of the slide, the rearward wall sloped in such a manner to permit the fastener to be wedged between the forward and rearward walls when trapped, yet provides sufficient clearance to permit the wall to move to the position whereat the rearward wall of the trap does not trap the fastener to permit the slide to slide forwardly, the slope of the rearward wall preferably being a portion of the involute;

(e) means to maintain the rearward wall normally in a trapping position (for example, a spring) to trap the fastener between the spaced forward and rearward walls.

In one embodiment the pivoting of the seatback forwardly causes the rearward wall to pivot to a position whereat the rearward wall of the trap does not trap the fastener thus permitting the slide to slide forwardly.

While the track and slide may be straight, they may also each be curved from an upper end positioned forwardly to a lower end positioned rearwardly. In preferred embodiments the radius of curvature may be between about 1500 to 2000 mm.

According to another aspect of the invention, the rearward wall may be carried by the forward position of a lever pivotally secured to permit the lever to be pivoted to a position trapping the fastener and to a position remote the fastener to permit the passage of the fastener past the lever.

According to another aspect of the invention, the front wall may form part of a thick plate extending from one side of the slide closest the other slide.

According to another aspect of the invention, each fastener preferably comprises at least a pair of retractable teeth for securing in adjacent apertures which teeth are operable in unison by operating means carried at the front of the seat operated through for example, a Bowden wire cable system or by a lever system.

The system may be operated by the pivoting of the seatback forwardly as is preferred or by a cable or lever system as the man skilled in the art may select.

According to another aspect of the invention, a comfort adjustment manual override seat track assembly is provided suitable for securing a seat (in one embodiment having a seat bottom and seatback pivotal with respect to the seat bottom) to the floor of a vehicle to permit the seat's position to be adjusted relative to the front of the vehicle and permit the seat to be moved from that adjusted position towards the front of the vehicle to permit maximum access to behind the seat and to be returned to that adjusted position, the assembly comprising:

(a) a pair of laterally spaced tracks and supports therefor for being secured to the vehicle, each track and support carrying a plurality of apertures along its length on the side of the track closest to the other track;

(b) a fastener slideably secured to each track and associated support for slideable movement relative thereto and for being removeably secured thereto by extending into at least one aperture precluding longitudinal movement with respect to the track and associated support of the fastener until deliberately disengaged therefrom;

(c) means to engage and disengage each such fastener from the at least one aperture of the track and associated support;

(d) a slide secured to each track for relative longitudinal movement with respect thereto and for being secured to the bottom of the seat each slide carrying a downwardly extending depending trap from the side of the slide closest the opposite slide and extending downwardly along the side of the track associated support in which the plurality of apertures are provided, the trap comprising a pair of generally downwardly extending longitudinally spaced walls, a forward wall and a rearward wall, the forward wall being closest to the front of a vehicle in which the assembly is mounted and being fixed relative to the slide and the rearward wall being displaceable (as for example, by pivoting) from a normally trapping position with the front wall to trap the associated fastener between the walls to a position whereby the rearward wall of the trap does not engage the fastener to permit the slide to slide forwardly, the motion of the displacement of the rearward wall of the trap being in a plane parallel to the direction of movement of the slide, the normally downwardly extending rearward wall sloped in such a manner from its upper end to its lower end away from the fastener and to permit the fastener to be wedged between the forward and rearward walls when trapped, yet provides sufficient clearance to permit the wall to move to the position whereat the rearward wall of the trap does not trap the fastener to permit the slide to travel forward, the slope of the rearward wall preferably being a portion of an involute while the forward wall preferably extends generally vertically; and (e) means to maintain a rearward wall normally in a downwardly extending trapping position to trap the fastener between the longitudinally spaced walls but which permits the rearward wall to be moved to a position to free the fastener from its "trapped" position. In one embodiment this means may comprise a spring. In another embodiment the rearward wall may be moved to a position to free the fastener from its trapped position when the seatback is pivoted forwardly.

According to another aspect of the invention, the rearward wall may be carried by the forward portion of a lever whose rear end and pivot position are above the fastener and which lever normally is pivoted to a lowered position "trapping" the fastener. When the front of the lever is raised, it is raised to a position above the fastener to permit passage of the lever above the fastener as the slide slides forwardly.

According to another aspect of the invention, the front wall may form part of a thick downwardly extending plate extending from one side of the slide closest the other slide.

According to another aspect of the invention, the fastener preferably comprises at least a pair of retractable teeth for securing in adjacent apertures which teeth are operable in union by operating means carried at the front of the seat operated through for example, a Bowden wire cable system or by a lever system.

Preferably the assembly comprises steel. Therefore, the parts are easily stamped or otherwise manufactured and easily assembled.

The invention will now be illustrated with reference to the following drawings, illustrating embodiments of the invention and the detailed description thereof.

BRIEF DESCRIPTION OF DRAWINGS OF EMBODIMENTS OF INVENTION

Figure 7:
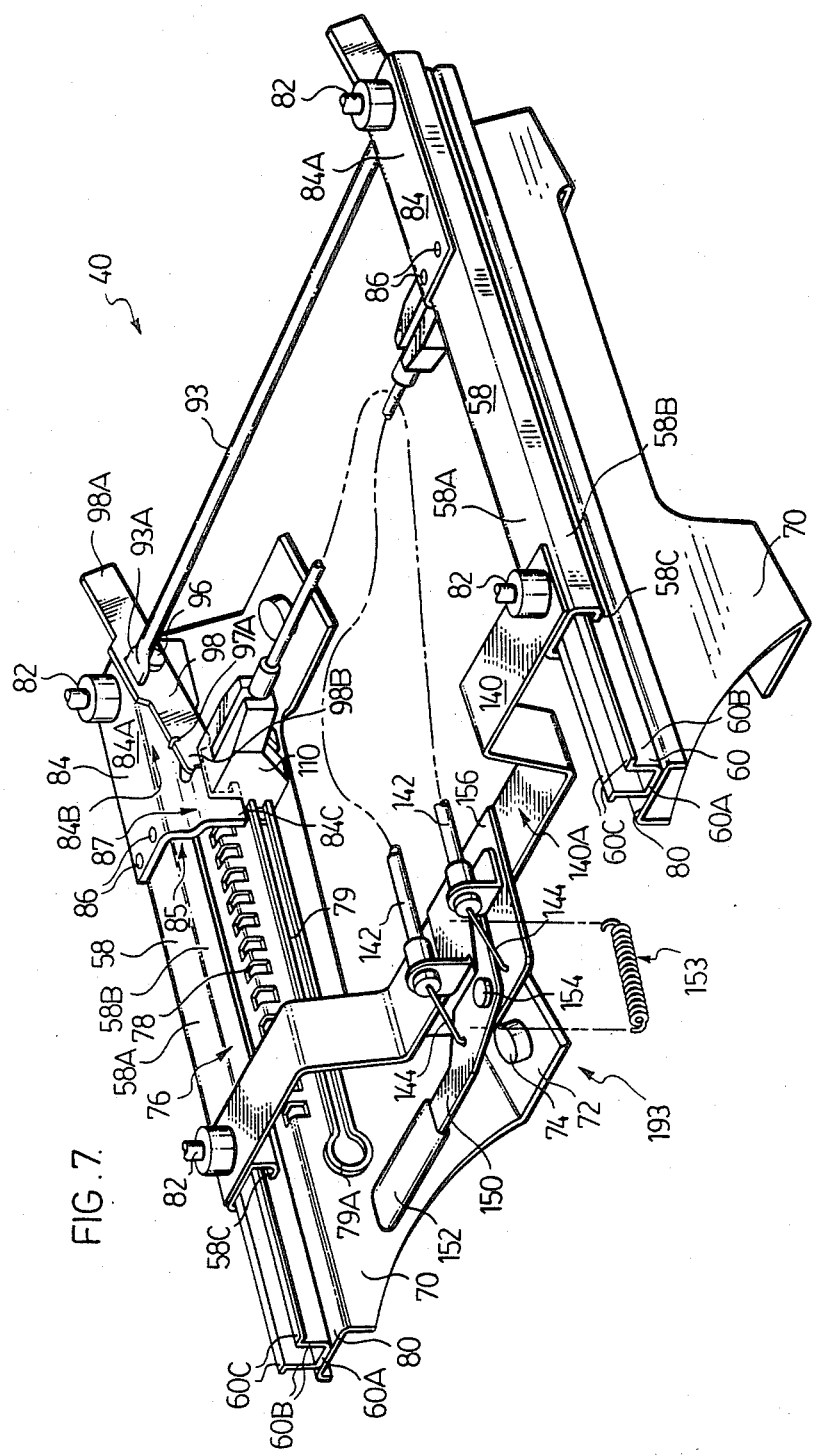
FIG. 7 is a perspective view of a comfort adjustment manual override seat track assembly according to one embodiment of the invention.

FIGS. 14 to 17 inclusive illustrate the operation of the structure shown in FIG. 7.

FIG. 18 is a perspective view of a comfort adjustment manual override seat track assembly according to another embodiment of the invention.

FIG. 19 is a perspective exploded view of part of the structure shown in FIG. 18.

FIGS. 20 and 21 are cross-sectional views of part of the structure shown in FIG. 18, illustrating the operation thereof.

FIGS. 22 to 25 inclusive illustrate the operation of the embodiment shown in FIG. 18.

Figure 26:
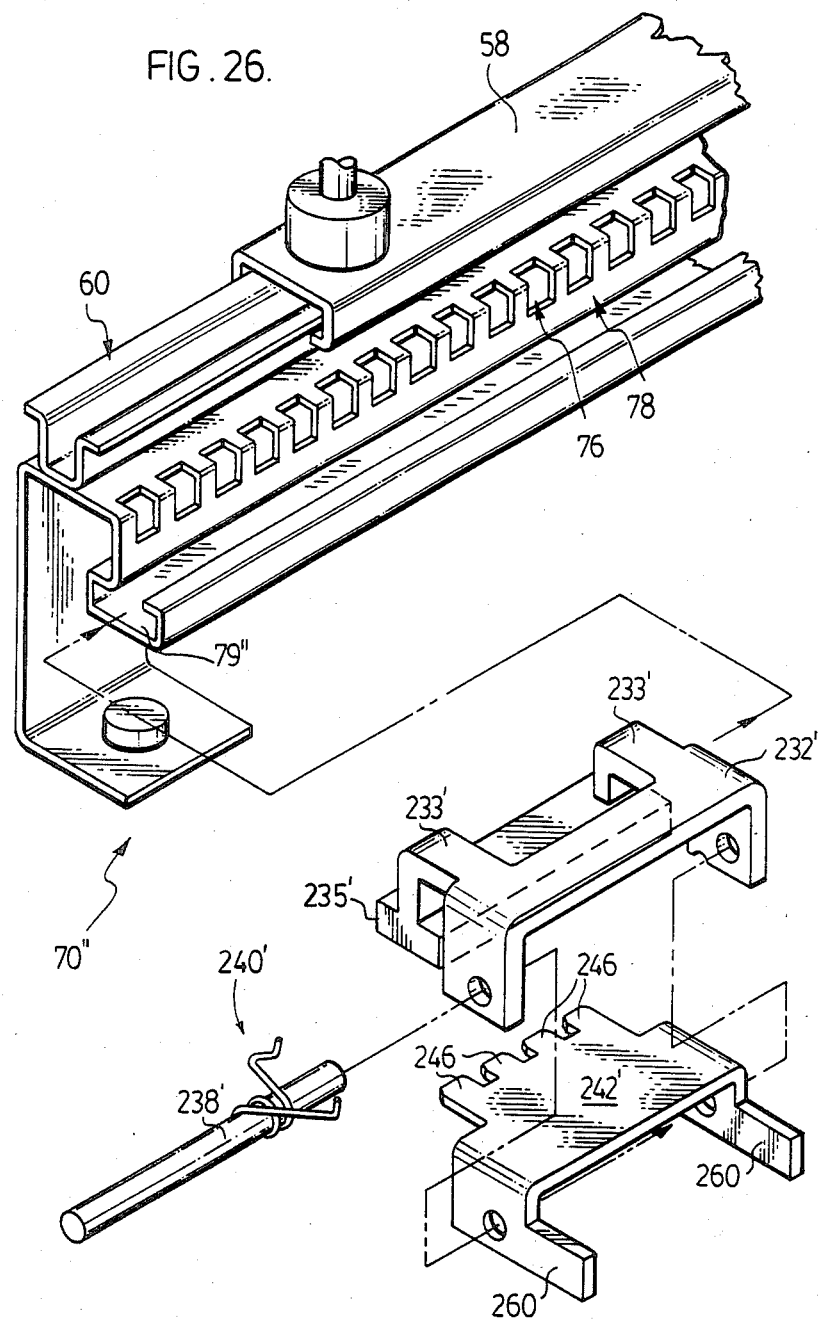

FIG. 26 is a perspective exploded view of part of the stucture of a comfort adjustment manual override seat track assembly according to another embodiment of the invention.

DETAILED DESCRIPTION OF THE EMBODIMENTS

Figure 1:
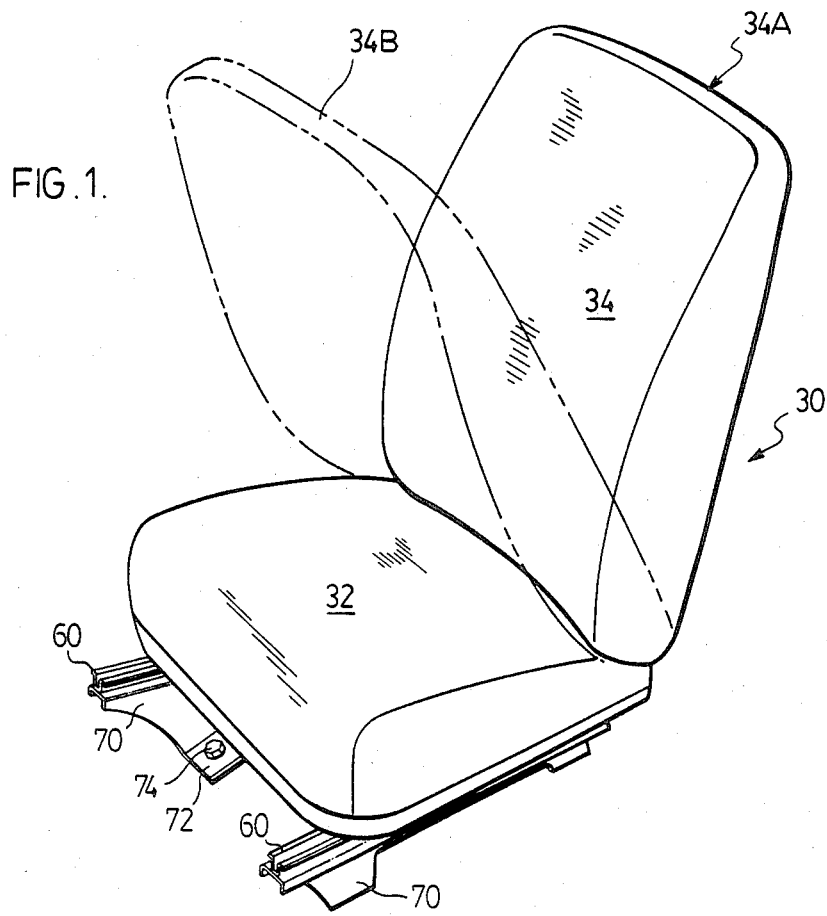
FIG. 1 is a perspective view of one front automobile seat constructed to incorporate the preferred embodiments of the invention (with parts not shown).

With reference to FIG. 1, there is shown front seat 30 of a two door down sized automobile (not shown) having seat bottom 32 and seatback 34 tiltable forwardly from its generally upright position 34A to that position shown by the broken line 34B.

Figure 6:
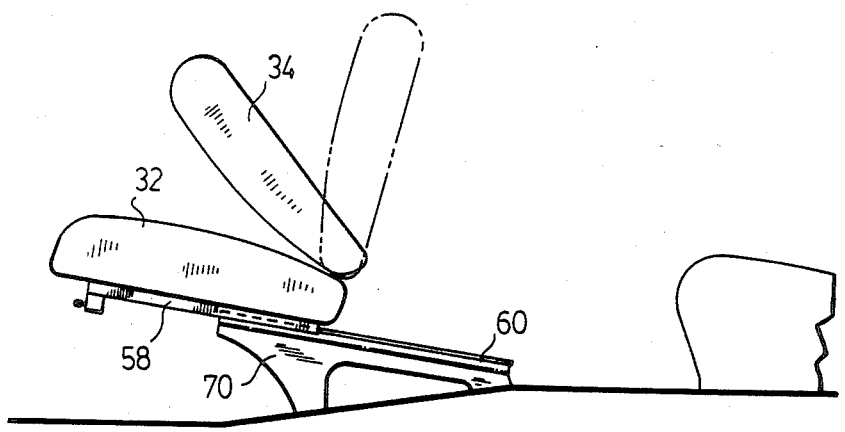
FIG. 6 is a side schematic view of the seat of FIG. 1 moved forward to the front of the track with the seatback pivoted forwardly.

Back 34 is pivotable from its upright position (34A) to its forwardly inclined position (34B) to activate the comfort adjustment manual override seat track assembly 40, shown in FIGS. 7 to 17 inclusive, 50 shown in FIGS. 18 to 25 inclusive and 70$^1$ shown in part in FIG. 26, for movement of their slides 58 secured to seat bottom 32 to their most forward position shown in FIG. 6 on each track 60.

Figure 2:
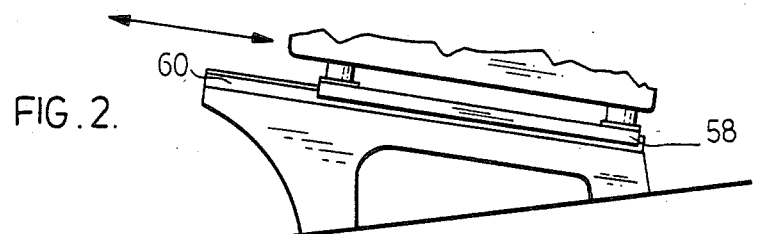
FIG. 2 is a schematic close-up side view of part of the structure shown in FIG. 1 according to one embodiment.
Figure 3:
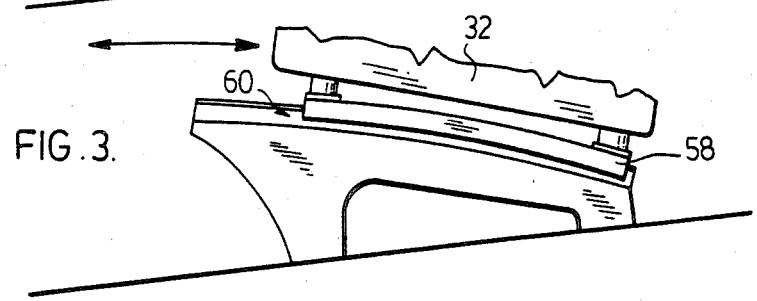
FIG. 3 is a schematic close-up side view of part of another structure according to another embodiment of the invention.
Figure 4:
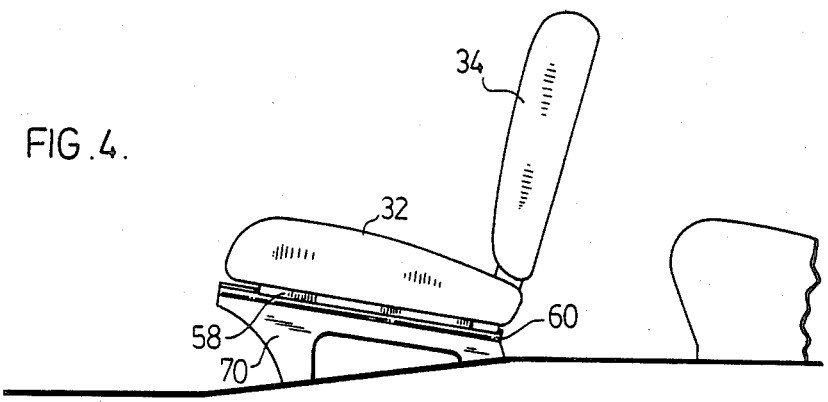
FIG. 4 is a side view of the structure shown in FIG. 1 according to the embodiments of the invention (with parts not shown).
Figure 5:
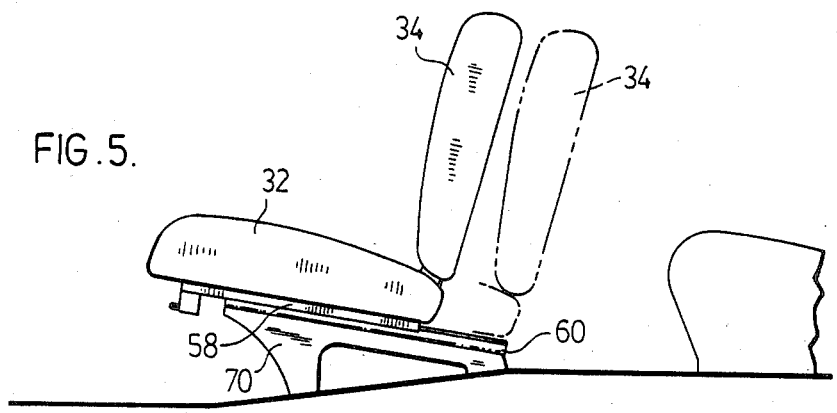
FIG. 5 is a side schematic view of the seat of FIG. 1 whose position is being adjusted.

Both the position of the slides 58 and thus of comfort adjustment manual override seat track assemblies 40 (FIG. 7), 50 (FIG. 18) and 70$^1$ (FIG. 26) are also adjustable on tracks 60 to the chosen position of a passenger (shown in FIG. 10) by movement of each of slides 58 relative to each track 60 and securing them in position as hereinafter described. With reference to FIG. 2, each track 60 and each slide 58 is straight. With reference to FIG. 3, each track 60 and each slide 58 is curved having a radius of 1500 mm.

With reference to FIGS. 7, 8, 9, 10, 11, 12 and 13, comfort adjustment manual override seat track assembly 40 is shown secured for use by steel mounts 70 to the floor 71 (see FIG. 10) of an automobile (not shown) by steel flange 72 using bolts 74 passing through flange 72 into the vehicle floor 71.

A row of rectangular shaped apertures 78 is provided through part of the length of each mount 70 on the side mount 70 closest the other mount 70. Mount 70 also includes an elongated slot 79 having a front end 79A and a rear end 79B (see FIG. 11).

Each of tracks 60 is supported on support 80 of mount 70 and secured thereto. Each track is an upside-down top hat in cross-section having bottom 60A, upstanding side walls 60B and outwardly extending flanges 60C. Each track 60 supports a slide 58 for slideable movement therealong carrying upstanding connectors 82 for securing to seat bottom 32. Each slide 58 is a downwardly opening channel and comprises top portion 58A, side walls 58B and inwardly directed lips 58C directly below the outwardly directed flanges 60C of each track 60 for securing each track 60 and slide 58 together and not permit the vertical separation thereof. Steel ball bearings 69 are positioned between flanges 58C and 60C to ease the sliding of each slide 58 relative to each track 60. Cylindrical rollers 71 (shown by dotted line in FIG. 9) is positioned in this space between slides 58 and track 60 carried in the channel formed between bottom 60A and side walls 60B. The extension of each slide 58 relative to each track 60 to which it is slideably secured is limited by roller 71 being jammed between upsets on the inside surfaces of slide 58 and associated track 60 to which it is slideably secured, two of which are shown at 73 and 75 in FIG. 9.

Each slide 58 carries trap 84 comprising a top portion 84A attached by rivets 86 to each slide 58 and generally downwardly extending portion 84B. Portion 84B at its leading end 85 carries an outwardly angled portion 87 carrying depending portion 84C carrying generally downwardly, extending wall 90 defined at its upper end by top wall 92 and at its lower end by rearwardly directed lip 94. Therefore, portion 84C is in a different plane than the other track portion 84B. Wall 90 is fixed in position on slide 58 opposite an aperture 76 of row of apertures 78. Lever 88 is pivotally secured on projection 96 to portion 84B of trap 84 normally urged by tension spring 97 to extend downwardly from rectangular aperture 93B to nose 99. In this regard end 97A is secured to overlie a top frontal portion of lever 98 and end 97B is hooked under curved wall 102A defining the upper extent of curved portion 102 removed from top 84 shown best in FIG. 8.

Figure 11:
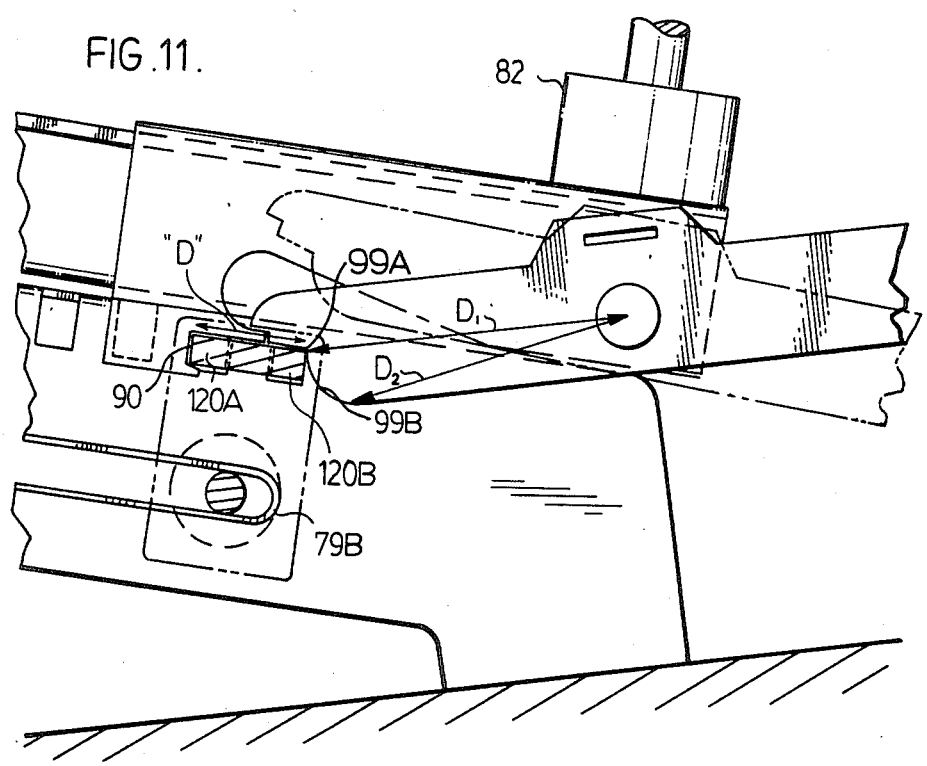
FIG. 11 is a side schematic view of part of the structure shown in FIG. 7.

Each lever 98 has a rear end 98A depressed by the pivoting of seatback 34 from its upright position 34A to its forwardly tilted position 34B in FIG. 1 thus pivoting each lever 98 on projection 96 resisted by spring 97 from its normally lowered position in FIG. 7 to a raised position, thereby raising front end 98B (see FIG. 11).

Each lever 98 is secured to the other lever 98 so that they act together by connecting rod 93 secured at either end 93A in rectangular apertures 93B in levers 98.

To accommodate the raising and lowering of the front end 98B, portion 84C as has been previously described, has been offset relative to portion 84B and includes ledge 92A above top wall 92 (see FIG. 8) and curved open portion 102 (devoid of metal material) above ledge 98 to accommodate the pivoting of lever 98. Therefore, when lever 98 has front portion 98B in its normally lowered position, (as shown in FIG. 7) wall 99A of nose 99 rides on ledge 92A of portion 84C (see FIG. 8), curved wall 99B being a portion of an involute having a decreasing radius, is positioned below nose 99 and slopes away from wall 90 from proximate wall 99A to lower end 99C of wall 99B. As is apparent, if the horizontal distance between wall 90 and intersection point 99A with wall 99B is "D" (see FIG. 11), then the horizontal distance between wall 90 and any other point on wall 99B is greater than distance "D".

Fastener 110 is provided to reciprocate in each slot 79 between ends 79A and 79B and carries two slots 112 in the side wall 114 closest slot 79 to receive lips 77A and carries pin 116 (see FIG. 9) therethrough to carry circular plate 118 of greater radius than the width of slot 79 to secure fastener 110 for longitudinal reciprocation of fastener 110 along the length of slot 79 and thus much of the length of track 60 and of support 80.

Fastener 110 carries a retractable bolt type latch 120 carrying two teeth 120A and 120B. Latch 120 is of a width "D" for wedging between wall 90 and upper end 99A of wall 99B of lever 98. Teeth 120A and 120B are so spaced to enter adjacent apertures 76 of row of apertures 78.

Figure 8:
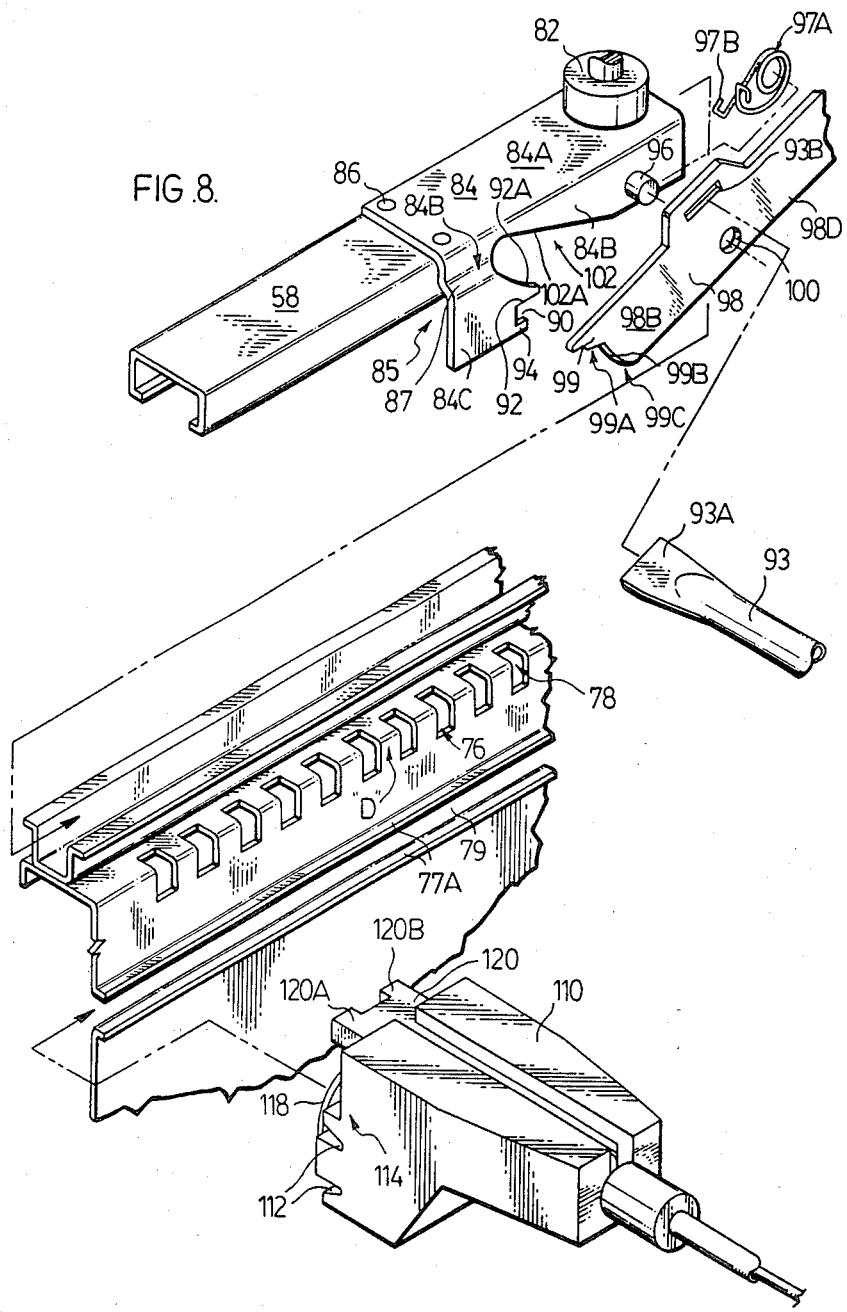
FIG. 8 is a perspective exploded view of part of the structure shown in FIG. 7.
Figure 9:
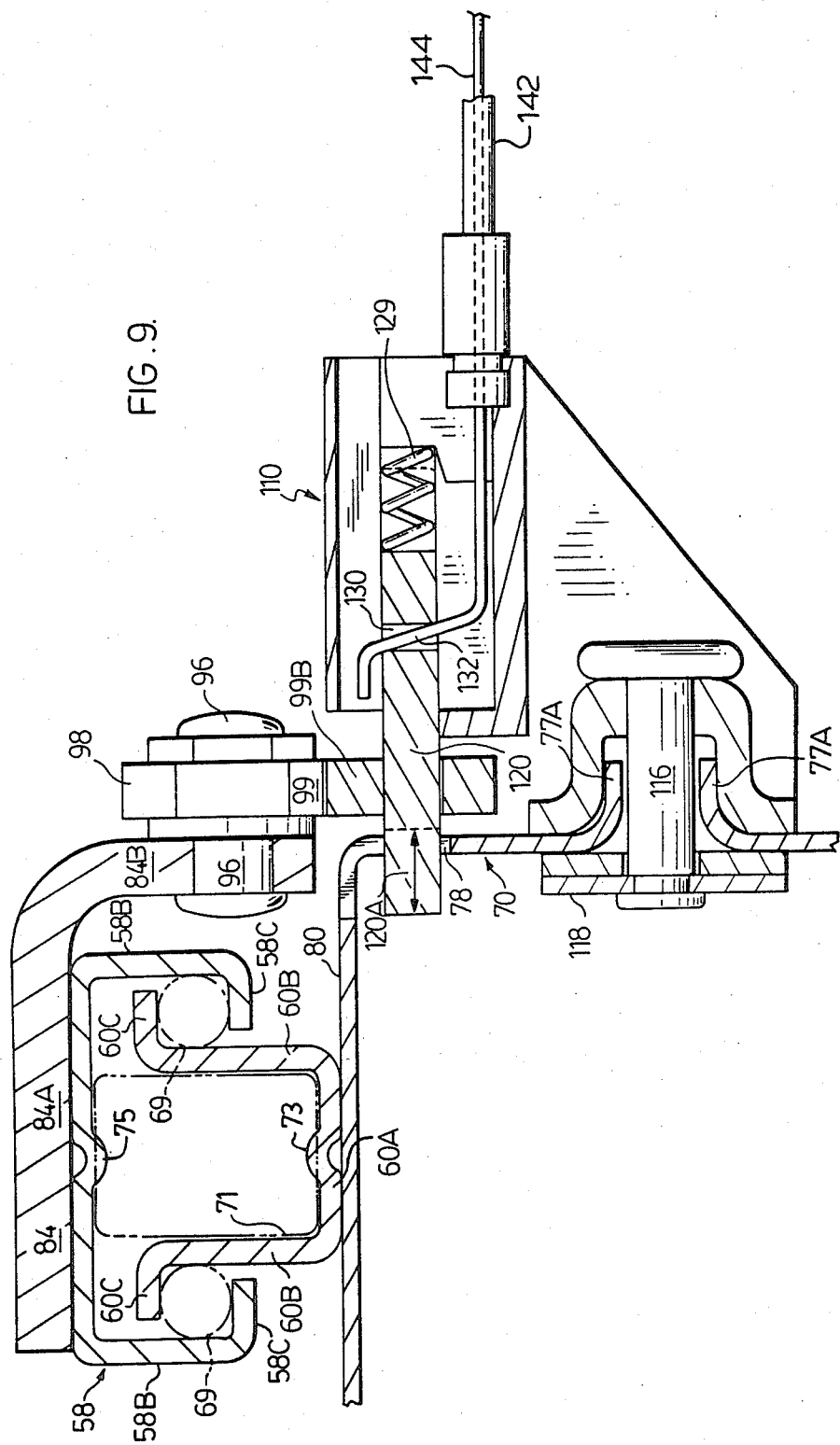
FIG. 9 is a cross-sectional view of part of the structure shown in FIG. 7.

With reference to FIGS. 7, 8, 9, each latch 120 is housed in each fastener 110 so that teeth 120A and 120B can be reciprocated into and out of adjacent apertures 76. Normally, teeth 120A and 120B are urged to project into adjacent apertures 76 by compression spring 129 trying to expand. Latch 120 carries vertical aperture 130 therethrough passing "Z" shaped spring steel wire member 132 which can be retracted away from mount 70 and moved towards mount 70 by the control of Bowden wire and cable system shown generally in FIGS. 7, 12 and 13.

Figure 12:
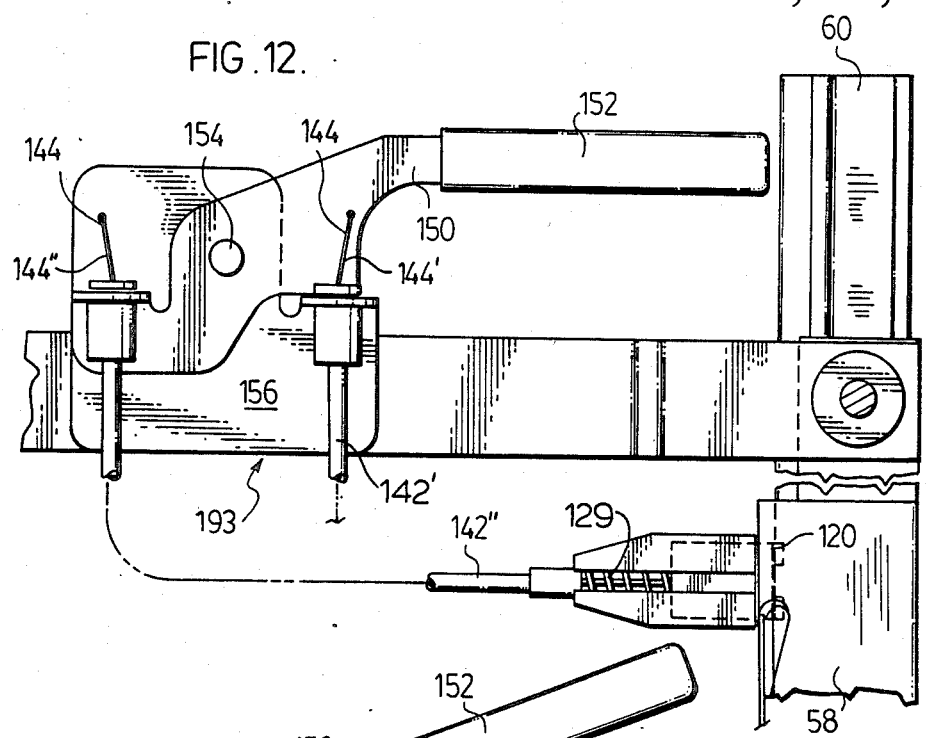
FIGS. 12 and 13 illustrate the operation of part of the structure shown in FIG. 7.
Figure 13:
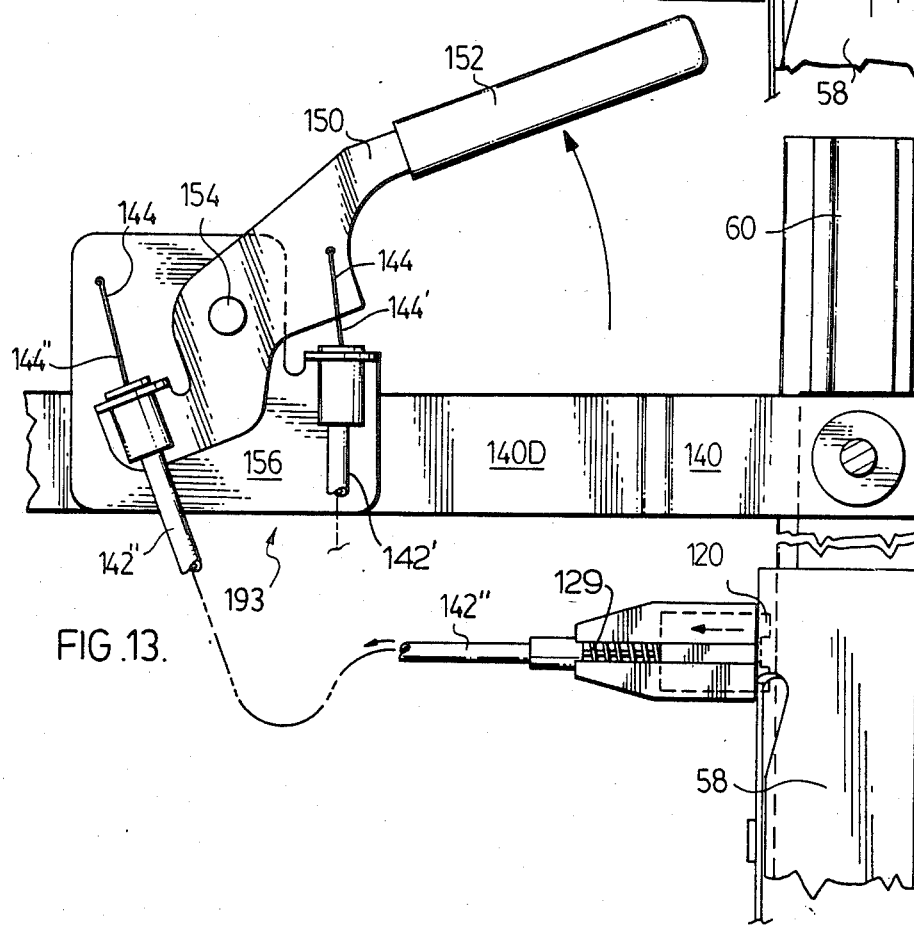

With reference to FIGS. 7, 12 and 13, metal strap 140 connecting slides 58 of each track 60 carries U-shaped recess 140A supporting Bowden wire and cable system generally indicated as 193 on plate 195 secured in U-shaped recess to strap 140. System 193 comprises two sleeves 142 covering two wires 144, connected to operate both latches 120, one sleeve 142 and one wire 144 to operate one latch. The system is connected as shown in FIGS. 7, 12 and 13 to operate both of latches 120 simultaneously for retraction of teeth 120A and 120B from apertures 76 by the pivoting of lever 150 by the rotation of arm 152 about pivot 154 secured to plate 156 mounted in recess 140A of strap 140. Spring 153 secured to plate 156 and lever 150 returns teeth 120A and 120B to project into adjacent apertures 76 of row of apertures 78 when lever 150 is released. Therefore, the pivoting of lever 150 counterclockwise (looking down from above the assembly—see FIG. 13) stretching spring 153 causes wire $144^1$ to be pulled relative to its covering sleeve $142^1$, and the pushing of sleeve $142^{11}$ (see FIG. 13) relative to wire $144^{11}$, thus providing identical relative motion in both sets of wires and sleeves ($144^1$ and $142^1$, and $142^{11}$ and $144^{11}$) and causing teeth 120A and 120B of each latch 120 to be retracted from adjacent aperture 76 against the action of spring 129 until arm 152 is released. Because sleeve $142^{11}$ is neither straight nor constrained, the compression of sleeve $142^{11}$ causes sleeve $142^{11}$ to flex from the position shown in FIG. 12 to the position shown in FIG. 13 bowing outwardly forming a partial loop. As the outer sleeve $142^{11}$ flexes, increasing its curvature, the cable $144^{11}$ is caused to follow the interior configuration of the sleeve, thereby pulling material from its ends. Because the end of the cable proxiimate pivot 154 is restrained but the other end is attached to latch 120 which is free to move against the action of spring 129, the latch teeth are withdrawn. Thereafter, the restoration of spring 153 to its initial unstretched configuration returns arm 152 to its position in FIG. 7.

With reference to FIGS. 14 to 17 inclusive, because each latch 120 is normally wedged between walls 90 and 99B if teeth 120A and 120B of each latch 120 are retracted from adjacent apertures 76, fastener 110 is free to slide in slot 79 from one end 79B to the other end 79A. Because each fastener 110 is free to slide, so is each top 84 and thus each slide 58 is free to slide relative to track 60 until fastener 110 reaches one of the ends 79A or 79B of slot 79 or roller 71 is wedged between upsets on track 60 and slide 58, for example, upsets 73 and 75. Therefore, when latches 120 of both fasteners 110 are retracted from apertures 76 by the rotation of lever arm 152 to the position shown in FIG. 13, the seat position may be adjusted relative to tracks 60 by sliding the seat bottom 32 to the desired position, thereafter releasing arm 152, causing teeth 120A and 120B of latches 120 to be pushed into adjacent apertures 76 by the action of spring 129 trying to restore to an uncompressed state, thereby securing the assembly. By trying to force the seat forward without rotating arm 152 and thus lever 150, the rear end of latch 120 proximate tooth 120B engages wall 99B stopping such action. In this mode, the complete assembly is securely locked against movement either forward or rearward and dislodgement can only occur through physical destruction.

Where it is desired to gain access to behind seat 30, seatback 34 is pivoted to the position 34B shown in FIG. 1, the pivoting causing a downward force to be applied to the rear end 98A of each lever 98, pivoting front end 98A upwardly (see FIG. 16) against the action of each spring 97, thus displacing lever 98 in a plane parallel to the direction of movement of slide 58. (Because wall 99B is curved in the manner as previously described, wall 98B does not hit latch 120.). Thereafter pushing of the seat 30 forwardly towards the front of the vehicle causes each of the fasteners 110 to be released from trap 84 because of the upward non-engaging position of lever 98 and slides 58 move forwardly without fasteners 110 to a stopped position shown as in FIG. 6 as a result of roller 71 being wedged between upsets on track 60 and slide 58 for example, upsets 73 and 75 in FIG. 9. After access has been gained to the back, the seat is pushed back and the seatback pivoted to its raised position. When the seat back 34 is pivoted to its upright position, spring 97 is released returning lever 98 to its initial position for trapping each fastener 110. In the event each latch 122 has not been captured by trap 84 between walls 90 and 99B by the time lever 98 is returned to its initial position, as seat 32 is returned, latch 120 at its end proximate tooth 120B engages lower wall 98D (see FIG. 8) of lever 98 causing lever 98 to pivot upwardly against the action of spring 97 until lever 98 "rides over" fastener latch 120 and "falls" behind latch 120 as a result of the action of spring 97 "wedging" latch 120 between walls 90 and position 99A of wall 99B.

As is also apparent, if the person 62 (shown in FIG. 10) is wearing a seat belt shoulder harness combination as required by law (and which seat belt is anchored to the car frame 195 and floor 71 as for example at 140 (floor) and 142 (side), in a front-end collision, the seat and driver would have a tendency to be thrown forward. However, the seat held by the latches 120 each trapped between walls 90 and 99B hold the seat in place. The person 62 because of the seat belt and harness combination and fixed front wall 90 is protected. In a rear-end collision the person is similarly protected but in this case by the seatback 34 and wall 99B.

With reference to FIGS. 18, 19, 20, 21 and 22, comfort adjustment manual override seat track assembly 50 is shown secured for use by mounts 70 to the floor 71 (see FIG. 10) of an automobile (not shown) by flange 72 using bolts 74 passing through flange 72 into the vehicle floor 71. A row of apertures 78 comprising a plurality of apertures 76 is provided through part of the length of each mount 70 on the side of mount 70 closest to the other mount 70, each aperture 76 providing a rectangular opening. Mount 70 also includes an elongated slot $79^1$ having a front end $79A^1$ and a rear end $79B^1$.

Each of tracks 60 and slide 58 is constructed and mounted as previously described.

In this embodiment slide 58 carries trap 184 comprising a top plate portion 184A fixed to slide 58 and a downwardly depending portion 184B carrying rectangular opening 186 therethrough. Portion 184B carries generally downwardly extending wall 190 defined at its upper end by top wall 192. The top portion 184A of trap 184 carries generally Y-shaped lever 200 comprising three arms 202A, 204 and 206 pivotably secured by pivot 208 to slide 58. On one slide 58 only (and as shown in FIG. 18) wire 210 is connected to arm 202 through aperture 202A to be pulled in the direction as shown in FIG. 18 by the pivoting of seatback 34 to position 34B shown in FIG. 1. As lever 200 is rotated clockwise (looking down from the top), arm 206 pivots about pivot 208. Arm 204 carries aperture 204A (see FIG. 19) to which is secured wire 212 which is tightly secured to arm 206 (of the other lever 200 on trap 184 on opposite slide 58) through aperture 206A. Therefore, when arm 200 is pivoted clockwise (looking down), wire 212 pulls arm 206 to which it is connected through aperture 206A to pivot counterclockwise (looking down). Therefore, both arms 206 are pivoted inwardly towards the other arm 206 when the back 34 of seat 30 is pivoted forwardly to position 34B in FIG. 1.

The outer edge 206B of arm 206 is curved so that the distance between pivot 208 and the outer edge 206B increases from side 206C of arm 206B nearest the other arm to the side 206D of arm 206 remote the other arm 206.

Wall portion 184B carries on the end thereof remote rectangular opening 186, circular opening 212 carrying pivot pin 214 for carrying lever 198 through aperture 216 at one end. Lever 198 carries flat lower portion 198A having on the end remote from aperture 216, nose 199 carrying on the underside thereof, wall 202 (see FIG. 19) and generally downwardly extending wall 199B forming a portion of an involute sloping away from wall 190 from proximate wall 202 to wall 199B's lower end 199C. At the other end of lever 198 remote from nose 199, connecting portion 198B extends upwardly therefrom joining portion 198A to portion 198C. Portion 198C extends in a direction parallel to portion 198A and terminates frontally in a nose 198D and a lower curved cam follower portion 198E for engaging curved surface 206B. Therefore, when surfaces 206B are drawn inwardly by the pushing of the seatback forwardly, portion 198E is forced rearwardly away from wall 190.

Trap 184 carries slot 220 at end of trap 184 which slot opens through the end proximate aperture 212 and lies in a plane co-planar with lever 198 when mounted. Nose 198D carries aperture 198F for receiving one end of spring 222. The other end of tension spring 222 is secured in notch 224 at the leading end of trap 184.

As is apparent from FIG. 18, portion 198A of lever 198 sits between portion 184B of trap 184 and downwardly extending wall 58B-nearest portion 184, with portion 198B carried in notch 220. Walls 202 and 199B together with walls 190 and 192 provide a downwardly opening U-shaped recess. As is apparent from FIG. 18, both levers 198 are pivoted to normally present their noses 199 to extend downwardly by the action of spring 222.

Fastener 230 is normally carried in the recess between walls 190, 192 and 202 and curved wall 199B is "trapped" therein.

With reference to FIGS. 18, 19, 20 and 21, fastener 230 comprises upside down U-shaped frame member 232 carrying slots 232A and 232B on the top portion, a front opening 232C above end wall formation 232D (see FIG. 20) and depending side walls 234 through which aligned apertures 236 are drilled to receive pivot pin 238 supporting torsion spring 240 having ends 240A and 240B. Latch 242 carries top portion 244 carrying teeth 246 extending from one side, and side walls 248 through which aligned apertures 250 have been provided for receiving pivot pin 238. The side of latch 242 opposite teeth 246 carries a notch 251, into which one end 240A of torsion spring 240 is fixed. The other end 240B of spring 240 is secured in notch 253 in side wall 234. Therefore, when latch 242 is assembled with frame 232, pivot pin 238 and spring 240, teeth 246 are urged to project through opening 232C by torsion spring 240.

Fastener 230 is fixed to mount 70 by means of formation 232D secured to abut lips or projections 81A above and below slot 79 by pins 254 secured to plate 252 on the other side of slot 79.

As is apparent, when fastener 230 is in the recess created by walls 190, 192, 202 and curved sloped wall 199B, walls 202 and 199B sit in slot 232B and walls 190 and 192 sit in slot 232A. At the same time, the two teeth 246 shown in FIG. 19 of latch 242 are locked in adjacent apertures 76.

With reference to FIGS. 18, 19, 20 and 21, teeth 246 may be removed from apertures 76 by the depression of arms 260 extending from the bottom of the side of latch 242 remote from teeth 246. Therefore, any downwardly directed force on one of arms 260 will cause latch 242 to rotate about pivot pin 238 "winding up" spring 240 and retracting teeth 246 from apertures 76. Thereafter, fastener 230 may be moved the length of slot 79 between ends 79A and 79B to adjust the position of seat 30 or until roller 71 is jammed between upsets of track 60 and slide 58. For this adjustment, U-shaped arm 262 is provided and carries end plates 264 at the ends of each arm 262A and 262B, each plate 264 being pivotally secured by pin 263 to portion 184B in advance (forward) of wall 190. Bent arms 264A and 264B radiate from each plate 264, arms 264A secured into rectangular opening 186 in portion 184B (which opening is longer than the width of arm 264A projecting thereinto) and arm 264B to sit on arm 260. Therefore, as the front end of arm 262 is grasped and lifted by cross-bar 265, arms 264A and 264B are pivoted clockwise, depressing arms 260 (limited by the rotation permitted arm 264A by the size of the opening of rectangular opening 186). Depressing one arm 260 on each latch assembly releases fastener 230 and thus trap 184 for sliding movement of slide 58 relative to track 60 for adjustment purposes. (See FIGS. 23 and 24). Release of cross-bar 265 permits spring 240 to unwind driving teeth 246 into apertures 76 securing each fastener 230 and thus trap 184 and slide 58 in position.

Where entry and/or access to behind the front seat is desired, back 34 is pivoted to the position 34B shown in FIG. 1, pulling wire 210 (shown in FIG. 18) pivoting lever 200 causing cam surface 206B to ride against surface 198E of lever 198 pushing surface 198E rearwardly causing lever 198 to pivot about pin 214 raising portion 198A and thus walls 202 and 199B away from each of the fasteners 230. Because only wall 199B is normally below the top of U-shaped frame member 232 when trap 184 traps latch 244 and member 232 (see FIG. 18) when lever 198 is pivoted, nose 199 and wall 199B are raised. Thereafter, forward sliding movement of seat 30 towards the front of the vehicle causes each slide 58 and trap 184 to slide towards the front of each track 60 until stopped by roller 71 being jammed between upsets carried by each slide 58 and track 60 as for example, by upsets 75 and 73. Thereafter, when seat 32 is moved backwards and seatback 34B is pivoted to its upright position, portion 198A is restored to its normal attitude. If its restoration to its original attitude occurs prior to its passing over fastener 230, as trap 184 is pushed back, portion 198A hits the side wall 234 of frame 232, rides over the top of frame 232 stretching spring 222 and restores it to its normal lowered position, after passing over frame 232 causing walls 190, 192, 202 and 199B to trap fastener 230. Once again, the distance between wall 190 and curved wall 199B proximate wall 202 is "D" and the width between the outer side edges of teeth 246 is such to cause the teeth to be wedged and locked between walls 190 and 199B when lever 198 and portion 198A are in their normally lowered trapping position shown in FIG. 18.

Figure 10:
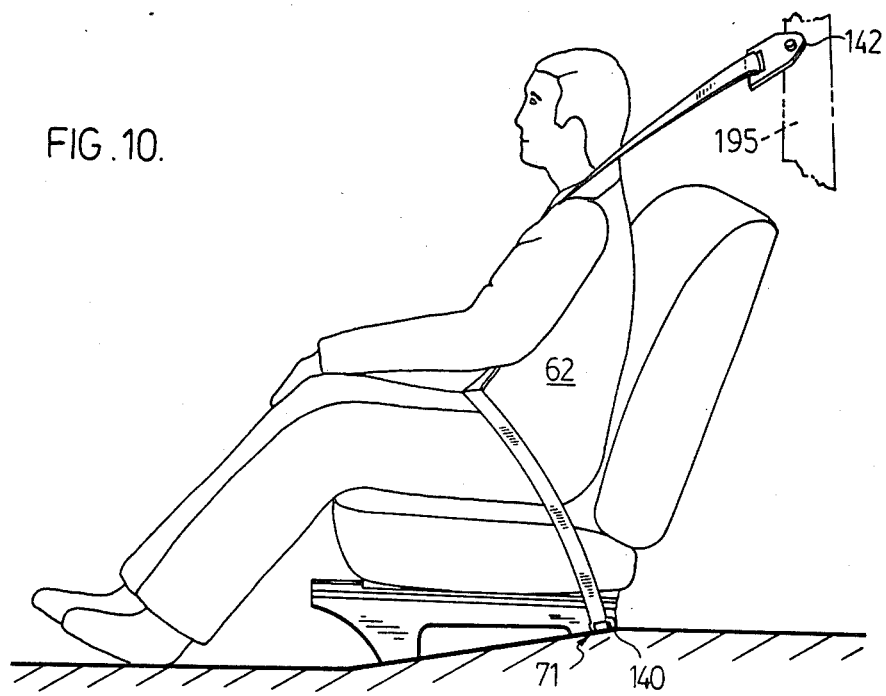
FIG. 10 is a side view of a driver wearing his seat and shoulder belt sitting on the seat of FIG. 1.

With reference to FIG. 10, with seat occupant 62 wearing the standard seat belt and shoulder harness, the occupant will be fully restrained in rear-end and front-end collisions.

With reference to FIG. 26, an alternate embodiment to the construction of mount 70 shown in FIG. 18 is taught. Particularly, mount $70^{11}$ carries channel $79^{11}$ instead of slot $79^1$. For securing frame $232^1$ to mount $70^{11}$, frame $232^1$ carries a pair of outrigger arms $233^1$ supporting outrigger channel slider member $235^1$ of about the same cross-sectional shape and area with allowance for clearance as channel $79^{11}$. Therefore, with latch $242^1$ carrying teeth 246, carried on pivot pin $238^1$ and wedged by spring $240^1$, normally forcing teeth 246 into apertures 76 of row apertures 78, latch $242^1$ is locked in channel $79^{11}$. When arms 260 are pushed downwardly in the manner disclosed in FIGS. 18 to 25 inclusive, pivoting teeth 246, from apertures 76, it is possible to readjust the seating position.

As is apparent, since many changes can be made to the embodiments of the invention disclosed without departing from the scope of the invention, it is intended that all matter contained herein be interpreted as illustrative of the invention and not in a limiting sense.

The embodiments of the invention in which an exclusive property or privilege is claimed are:

1. A comfort adjustment manual override seat track assembly suitable for securing a seat to the floor of a vehicle to permit the seat's position to be adjusted relative to the front of the vehicle and permit the seat to be moved from that adjusted position towards the front of the vehicle to permit maximum access to behind the seat and to be returned to that adjusted position, the assembly comprising:
   (a) a pair of laterally spaced tracks and supports therefor for being secured to the vehicle, at least one of the tracks and supports carrying a plurality of apertures along its length;
   (b) a fastener slideably secured to at least one of the track and associated supports carrying the plurality of apertures for slideable movement relative thereto and for being removeably secured thereto by extending into at least one aperture precluding longitudinal movement with respect to the track and associated support of the fastener until deliberately disengaged therefrom;
   (c) means to engage and disengage each such fastener from the at least one aperture of the track and associated supports;
   (d) a slide secured to each track and support to which each fastener is slideably secured for relatively longitudinal movement with respect thereto and for being secured to the bottom of the seat, each slide carrying a depending trap, the trap comprising a pair of spaced walls, a forward wall and a rear wall, the forward wall being closest to the front of the vehicle in which the assembly is mounted and being fixed relative to the slide and the rearward wall being displaceable from a normally trapping position with the front wall to trap the associated fastener between the walls, to a position whereat the rearward wall of the trap does not trap the fastener to permit the slide to travel forward, the motion of the displacement of the rearward wall of the trap being in a plane parallel to the direction of movement of the slide, the rearward wall sloped in such a manner to permit the fastener to be wedged between the forward and rearward walls when trapped, yet provides sufficient clearance to permit the wall to move to the position whereat the rearward wall of the trap does not trap the fastener to permit the slide to slide forwardly; and
   (e) means to maintain the rearward wall in normally trapping position to trap the fastener between the spaced forward and rearward walls until the rearward wall is displaced to a position at which it does not trap the fastener thus permitting the slide to travel forwardly.

2. The seat track assembly of claim 1, wherein the seat comprises a seat bottom and seatback and the pivoting of the seatback forwardly causes the displacement of the rearward wall of the trap to a position at which it does not trap the fastener.

3. The seat track assembly of claim 1, wherein the plurality of apertures extends along the side of the track and support closest to the other track and support.

4. The seat track of claim 1, wherein both tracks and supports carry a plurality of apertures on the sides thereof closest the other track and support, and a fastener is slideably secured to each track and support.

5. The seat track assembly of claim 4, wherein the depending slide extends from the side of the slide closest the opposite slide.

6. The seat track assembly of claim 2, wherein both tracks and supports carry a plurality of apertures on the sides thereof closest the other track and support and a fastener is slideably secured to each track and support.

7. The seat track assembly of claim 6, wherein the depending slide extends from the side of the slide closest the opposite slide.

8. The seat track assembly of claim 1, wherein the slope of the rearward wall is a portion of an involute.

9. The seat track assembly of claim 2, wherein the slope of the rearward wall is a portion of an involute.

10. The seat track assembly of claim 3, wherein the slope of the rearward wall is a portion of an involute.

11. The seat track assembly of claim 4, wherein the slope of the rearward wall is a portion of an involute.

12. The seat track assembly of claim 5, wherein the slope of the rearward wall is a portion of an involute.

13. The seat track assembly of claim 6, wherein the slope of the rearward wall is a portion of an involute.

14. The seat track assembly of claim 7, wherein the slope of the rearward wall is a portion of an involute.

15. The seat assembly of claim 1, wherein the track and slide are each curved, curving from an upper end positioned forwardly to a lower end positioned rearwardly.

16. The seat assembly of claim 2, wherein the track and slide are each curved, curving from an upper end positioned forwardly to a lower end positioned rearwardly.

17. The seat assembly of claim 3, wherein the track and slide are each curved, curving from an upper end positioned forwardly to a lower end positioned rearwardly.

18. The seat assembly of claim 4, wherein the track and slide are each curved, curving from an upper end positioned forwardly to a lower end positioned rearwardly.

19. The seat assembly of claim 5, wherein the track and slide are each curved, curving from an upper end positioned forwardly to a lower end positioned rearwardly.

20. The seat assembly of claim 6, wherein the track and slide are each curved, curving from an upper end positioned forwardly to a lower end positioned rearwardly.

21. The seat assembly of claim 7, wherein the track and slide are each curved, curving from an upper end positioned forwardly to a lower end positioned rearwardly.

22. The seat track assembly of claim 1, wherein the rearward wall is carried by the forward portion of a lever pivotally secured to permit the lever to be pivoted to a position trapping the fastener and to a position remote the fastener to permit passage of the fastener past the lever.

23. The seat track assembly of claim 2, wherein the rearward wall is carried by the forward portion of a lever pivotally secured to permit the lever to be pivoted to a position trapping the fastener and to a position remote the fastener to permit passage of the fastener past the lever.

24. The seat track assembly of claim 3, wherein the rearward wall is carried by the forward portion of a lever pivotally secured to permit the lever to be pivoted to a position trapping the fastener and to a position remote the fastener to permit passage of the fastener past the lever.

25. The seat track assembly of claim 4, wherein the rearward wall is carried by the forward portion of a lever pivotally secured to permit the lever to be pivoted to a position trapping the fastener and to a position remote the fastener to permit passage of the fastener past the lever.

26. The seat track assembly of claim 5, wherein the rearward wall is carried by the forward portion of a lever pivotally secured to permit the lever to be pivoted to a position trapping the fastener and to a position remote the fastener to permit passage of the fastener past the lever.

27. The seat track assembly of claim 6, wherein the rearward wall is carried by the forward portion of a lever pivotally secured to permit the lever to be pivoted to a position trapping the fastener and to a position remote the fastener to permit passage of the fastener past the lever.

28. The seat track assembly of claim 7, wherein the rearward wall is carried by the forward portion of a lever pivotally secured to permit the lever to be pivoted to a position trapping the fastener and to a position remote the fastener to permit passage of the fastener past the lever.

29. The seat track assembly of claim 1, wherein each fastener comprises at least a pair of retractable teeth for securing in adjacent apertures which teeth are operable in unison.

30. The seat track assembly of claim 2, wherein each fastener comprises at least a pair of retractable teeth for securing in adjacent apertures which teeth are operable in unison.

31. The seat track assembly of claim 3, wherein each fastener comprises at least a pair of retractable teeth for securing in adjacent apertures which teeth are operable in unison.

32. The seat track assembly of claim 4, wherein each fastener comprises at least a pair of retractable teeth for securing in adjacent apertures which teeth are operable in unison.

33. The seat track assembly of claim 5, wherein each fastener comprises at least a pair of retractable teeth for securing in adjacent apertures which teeth are operable in unison.

34. The seat track assembly of claim 6, wherein each fastener comprises at least a pair of retractable teeth for securing in adjacent apertures which teeth are operable in unison.

35. The seat track assembly of claim 7, wherein each fastener comprises at least a pair of retractable teeth for securing in adjacent apertures which teeth are operable in unison.

36. A comfort adjustment manual override seat track assembly suitable for securing a seat to the floor of a vehicle to permit the seat's position to be adjusted relative to the front of the vehicle and permit the seat to be moved from that adjusted position towards the front of the vehicle to permit maximum access to behind the seat, and to be returned to that adjusted position, the assembly comprising:
(a) a pair of laterally spaced tracks and supports therefor for being secured to the vehicle, each track and support carrying a plurality of apertures along its length on the side of the track closest to the other track;

(b) a fastener slideably secured to each track and associated support for slideable movement relative thereto and for being removeably secured thereto by extending into at least one aperture precluding longitudinal movement with respect to the track and associated support of the fastener until deliberately disengaged therefrom;

(c) means to engage and disengage each such fastener from the at least one aperture of the track and associated support;

(d) a slide secured to each track for relative longitudinal movement with respect thereto and for being secured to the bottom of the seat each slide carrying a downwardly extending depending trap from the side of the slide closest the opposite slide and extending downwardly along the side of the track and associated support in which the plurality of apertures are provided, the trap comprising a pair of generally downwardly extending longitudinally spaced walls, a forward wall and a rearward wall, the forward wall being closest to the front of the vehicle in which the assembly is mounted and being fixed relative to the slide and the rearward wall being displaceable from a normally trapping position with the front wall to trap the associated fastener between the walls to a position whereby the rearward wall of the trap does not engage the fastener to permit the slide to slide forwardly, the motion of the displacement of the rearward wall of the trap being in a plane parallel to the direction of movement of the slide, the normally downwardly extending rearward wall sloped in such a manner from its upper end to its lower end away from the fastener to permit the fastener to be wedged between the forward and rearward walls when trapped yet provides sufficient clearance to permit the wall to move to the position whereat the rearward wall of the trap does not trap the fastener to permit the slide to travel forward; and (e) means to maintain the rearward wall normally in a downwardly extending trapping position to trap the fastener between the longitudinally spaced walls but which permits the rearward wall to be moved to a position to free the fastener from its trapped position.

37. The seat track assembly of claim 36, wherein the seat comprises a seat bottom and seatback and the pivoting of the seatback forwardly causes the displacement of the rearward wall of the trap to position at which it does not trap the fastener.

38. The seat track assembly of claim 36, wherein the slope of the rearward wall is a portion of an involute.

39. The seat track assembly of claim 37, wherein the slope of the rearward wall is a portion of an involute.

40. The seat track assembly of claim 36, wherein the track and slide are each curved, curving from an upper end positioned forwardly to a lower end positioned rearwardly.

41. The seat track assembly of claim 37, wherein the track and slide are each curved, curving from an upper end positioned forwardly to a lower end positioned rearwardly.

42. The assembly of claim 36, wherein the rearward wall being displacable from a normally trapping position with the forward wall to a position whereby the rearward wall of the trap does not engage the fastener to permit the slide to slide forwardly is accomplished by pivoting.

43. The assembly of claim 36, wherein the rearward wall is carried by the front of a lever whose rear end and pivot position are above the fastener and which lever is normally pivoted to a lowered position trapping the fastener and which front of the lever is raised to a position above the fastener to permit passage of the lever above the fastener.

44. The assembly of claim 37, wherein the rearward wall is carried by the front of a lever whose rear end and pivot position are above the fastener and which lever is normally pivoted to a lowered position trapping the fastener and which front of the lever is raised to a position above the fastener to permit passage of the lever above the fastener.

45. The assembly of claim 36, wherein the fastener comprises at least a pair of retractable teeth for securing in adjacent apertures, the teeth being retractable in unison by operating means carried at the front of the seat.

46. The assembly of claim 37, wherein the fastener comprises at least a pair of retractable teeth for securing in adjacent apertures, the teeth being retractable in unison by operating means carried at the front of the seat.

47. The assembly of claim 40, wherein the fastener comprises at least a pair of retractable teeth for securing in adjacent apertures, the teeth being retractable in unison by operating means carried at the front of the seat.

48. The assembly of claim 41, wherein the fastener comprises at least a pair of retractable teeth for securing in adjacent apertures, the teeth being retractable in unison by operating means carried at the front of the seat.

49. The assembly of claim 45, wherein said means carried at the front of the seat comprises a cable system which is used to retract the teeth of each fastener in unison.

50. The assembly of claim 46, wherein said means carried at the front of the seat comprises a cable system which is used to retract the teeth of each fastener in unison.

51. The assembly of claim 47, wherein said means carried at the front of the seat comprises a cable system which is used to retract the teeth of each fastener in unison.

52. The assembly of claim 48, wherein said means carried at the front of the seat comprises a cable system which is used to retract the teeth of each fastener in unison.

* * * * *